United States Patent
Sun

(10) Patent No.: US 10,026,417 B2
(45) Date of Patent: Jul. 17, 2018

(54) AUDIO DRIVEN ACCELERATED BINGE WATCH

(71) Applicant: OpenTV, Inc., San Francisco, CA (US)

(72) Inventor: Kai Sun, Cupertino, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 15/136,278

(22) Filed: Apr. 22, 2016

(65) Prior Publication Data
US 2017/0309296 A1 Oct. 26, 2017

(51) Int. Cl.
*G10L 21/04* (2013.01)
*G10L 21/043* (2013.01)
(Continued)

(52) U.S. Cl.
CPC ............ *G10L 21/043* (2013.01); *G10L 15/25* (2013.01); *G10L 25/57* (2013.01); *G10L 25/78* (2013.01);
(Continued)

(58) Field of Classification Search
CPC ......... G10L 15/25; G10L 25/57; G10L 25/78; G10L 15/24; G10L 15/22; G10L 15/222; G10L 25/48; G10L 2025/783; G10L 2025/786; G10L 21/04; G10L 21/043; G10L 21/045; G10L 21/047; G10L 21/049; G10L 21/055; G10L 21/057;
(Continued)

(56) References Cited

U.S. PATENT DOCUMENTS 5,774,192 A * 6/1998 Koyama ............... H04N 5/9267
348/513
5,878,391 A * 3/1999 Aarts ........................ G10H 1/00
704/206
(Continued)

FOREIGN PATENT DOCUMENTS

JP 2000324395 A * 11/2000
WO WO-20171849551 A1 10/2017

OTHER PUBLICATIONS

"International Application Serial No. PCT/US2017/028794, International Search Report dated May 15, 2017", 5 pgs.
(Continued)

*Primary Examiner* — Feng Niu
*Assistant Examiner* — Stephen M Brinich
(74) *Attorney, Agent, or Firm* — Schwegman Lundberg & Woessner, P.A.

(57) ABSTRACT

Example embodiments provide systems and methods for accelerating digital content playback based on speech. A content acceleration system electronically accesses digital content. The system analyzes the digital content to detect at least one audio portion within the digital content, each of the at least one audio portion comprising speech. The system creates at least one digital content segment from the digital content based on the at least one audio portion, whereby a beginning of each digital content segment of the at least one digital content segment coincides with a beginning of a corresponding audio portion of the at least one audio portion. The system then accelerates playback of the digital content by fast forwarding through parts of the at least one digital content segment where speech is absent.

24 Claims, 7 Drawing Sheets

(51) Int. Cl.
*G10L 25/57* (2013.01)
*G10L 25/78* (2013.01)
*G10L 15/25* (2013.01)
*H04N 21/2387* (2011.01)
*H04N 21/472* (2011.01)
*H04N 21/233* (2011.01)
*H04N 21/439* (2011.01)

(52) U.S. Cl.
CPC ....... *H04N 21/233* (2013.01); *H04N 21/2387* (2013.01); *H04N 21/439* (2013.01); *H04N 21/47217* (2013.01)

(58) Field of Classification Search
CPC ............. G10L 2021/0575; G10L 15/02; G10L 2015/022; G10L 2015/025; G10L 2015/027; H04N 21/233; H04N 21/2387; H04N 21/439; H04N 21/47217; H04N 21/2335; H04N 21/2381; H04N 21/4392; H04N 21/4394; H04N 21/4396; H04N 21/4398; G06F 17/3074; G06F 17/30743; G06F 17/30749; G06F 17/30755; G06F 17/30769; G06F 17/30775; G06F 17/30778; G06K 9/00335; G06K 9/00711; G06K 9/00771; G06K 9/00785; G11B 27/34

USPC ............... 704/215, 211, 231–235, 275, 1–10
See application file for complete search history.

(56) References Cited

U.S. PATENT DOCUMENTS

| | | | |
|---|---|---|---|
| 7,551,842 B2* | 6/2009 | Chen ..................... | H04N 9/8227 386/244 |
| 2006/0036783 A1* | 2/2006 | Aarts ..................... | H04N 5/783 710/58 |
| 2007/0122119 A1* | 5/2007 | Seo ......................... | G11B 27/10 386/241 |
| 2007/0124148 A1* | 5/2007 | Okutani ................ | G10L 13/033 704/265 |
| 2015/0012270 A1* | 1/2015 | Reynolds ................ | G10L 25/84 704/233 |
| 2016/0093314 A1* | 3/2016 | Yamahara ............. | H04M 19/04 704/225 |

OTHER PUBLICATIONS

"International Application Serial No. PCT/US2017/028794, Written Opinion dated May 15, 2017", 5 pgs.

* cited by examiner

AUDIO DRIVEN ACCELERATED BINGE WATCH

FIELD

The present disclosure relates generally to machines configured to present digital content and, in a specific example embodiment, to mechanisms for dynamically accelerating digital content presentation.

BACKGROUND

While consuming digital content, a user may consider a portion of the digital content to be slow or not important (e.g., a scenery scene with music and no dialog). The user may want to accelerate through the slow or not important portions in order to, for example, binge watch or consume the digital content (e.g., watch as much as possible in a reduced time frame). Typically, the user can manually fast forward. For example, the user can fast forward at twice a normal playback speed (2×), four times the normal playback spend (4×), and so forth. The user can also skip to a next chapter. In some cases, services allow the user to listen to a podcast faster (e.g., listen to 10 minute sequence in 8 minutes) by increasing a playback speed.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail.

Example embodiments described herein provide systems and methods for dynamically accelerating digital content presentation. In particular, example embodiments provide mechanisms and logic that accelerates digital content playback based on speech detected in the digital content. In example embodiments, the system electronically accesses digital content. The system can be located at a digital receiver (e.g., set top box, smart television) or a headend. The system then analyzes the digital content to detect one or more audio portions within the digital content, each of the one or more audio portions comprise speech. The one or more audio portions can be verified by using lip movement detection, scene change detection, or subtitle data. One or more of digital content segments are created from the digital content based on the one or more audio portions, whereby a beginning of each digital content segment of the one or more segments coincides with a beginning of a corresponding audio portion of the one or more audio portions. Playback of the digital content is accelerated by fast forwarding through parts of the at least one digital content segment where speech is absent.

As a result, one or more of the methodologies described herein facilitate solving the technical problem of dynamically accelerating digital content presentation. The methodologies include detecting speech in digital content and segmenting the digital content based on the detected speech. The logic also dynamically, without human intervention, accelerates digital content through portions where speech does not exist. As a result, one or more of the methodologies described herein may obviate a need for certain efforts or resources that otherwise would be involved in manually fast forwarding and potentially rewinding when fast forwarding goes past a point where the user intended to stop. Additionally, resources used by one or more machines, databases, or devices (e.g., within the environment) may be reduced. Examples of such computing resources include processor cycles, network traffic, memory usage, data storage capacity, power consumption, network bandwidth, and cooling capacity.

Figure 1:
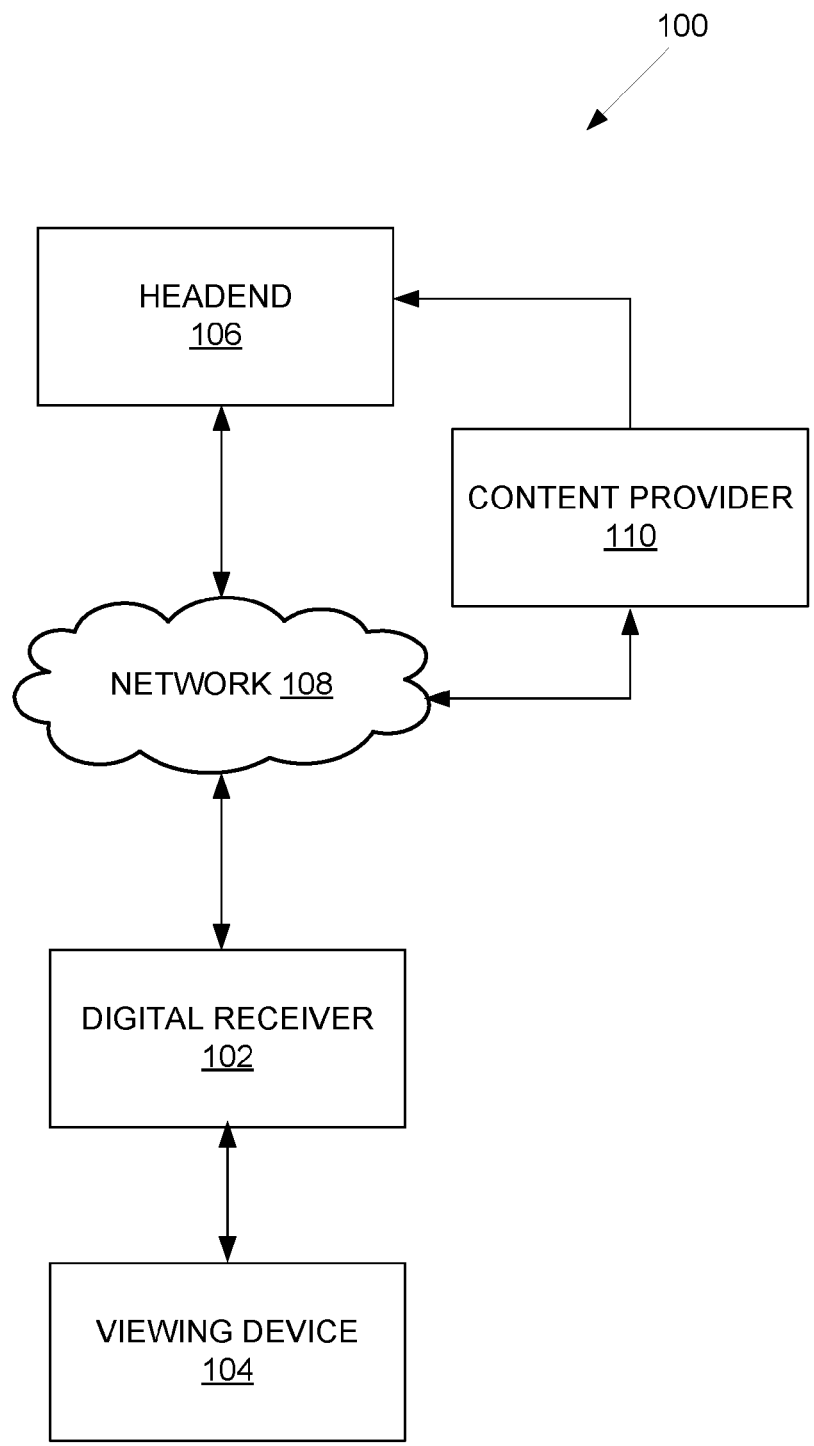
FIG. 1 is a diagram illustrating an example environment for dynamically accelerating digital content presentation.

With reference to FIG. 1, a diagram illustrating an example environment 100 comprising a system for dynamically accelerating digital content presentation is shown. In example embodiments, a digital receiver 102 of a user provides access to digital content. In one embodiment, the digital receiver 102 is a set-top box. The digital receiver 102 is coupled to a viewing device 104 (e.g., a television or monitor) on which the user can view the digital content. In some embodiments, the digital receiver 102 may be combined with the viewing device 104 (e.g., a smart television).

Since the user accesses the digital content through the digital receiver 102, the digital receiver 102 is configured to receive commands with respect to the digital content. In example embodiments, the commands include instructions to fast forward the digital content (e.g., from a remote control device). The instructions causes the digital receiver 102 to fast forward through portions of the digital content that may not contain speech or to skip those portions. The digital receiver 102 may also speed up the audio (e.g., by 10%) of the digital content. Accordingly, in one embodiment, a mechanism on a remote control device is activated and sends a signal to the digital receiver 102 to enter an audio driven conversation mode. In the audio driven conversation mode, the fast forward or acceleration of the digital content is automatic (e.g., without human intervention of having to manually fast forward and stop at various locations of the digital content).

In some embodiments, the digital receiver 102 comprises logic to analyze the digital content and dynamically process the digital content to cause the accelerated presentation. In other embodiments, a headend 106 processes or preprocesses the digital content before transmitting the processed digital content over a network 108 to the digital receiver 102. The network 108 may comprise the Internet, wireless network, cellular network, or a Wide Area Network (WAN).

Further still, a content provider 110 is coupled to the network 108. The content provider 110 stores or provides digital content to the headend 106 or the digital receiver 102 via the network 108. The digital content may comprise audio/video content (e.g., movies, television shows) or audio content (e.g., podcasts).

It is noted that the environment 100 shown in FIG. 1 is merely an example. For instance, not all components of the environment 100 may be shown. Additionally, some components of the environment 100 may be combined. For example, the digital receiver 102 may be embodied within the viewing device 104 to form a single device (e.g., a smart television). Furthermore, operations discussed as occurring at the digital receiver 102 may be performed at the headend 106 whereby processed digital content is transmitted to the digital receiver 102 for presentation.

Figure 2:
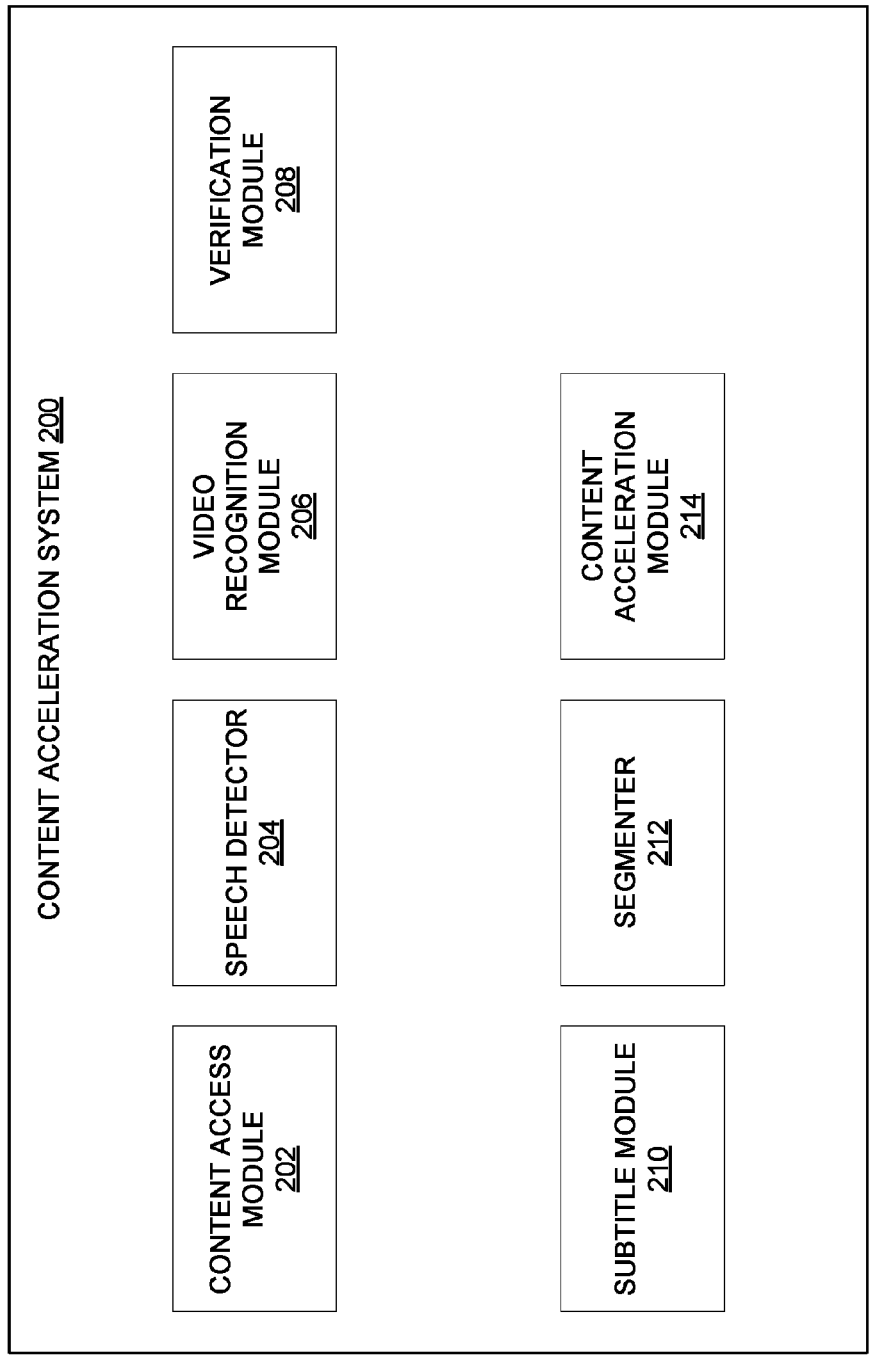
FIG. 2 is a block diagram illustrating an example embodiment of a content acceleration system.

FIG. 2 is a block diagram illustrating an example embodiment of a content acceleration system 200. In example embodiments, the content acceleration system 200 is embodied within the digital receiver 102. In an alternative embodiment, the content acceleration system 200 is embodied within the headend 106, and the headend 106 processes the digital content before transmitting the processed digital content to the digital receiver 102 for presentation. The content acceleration system 200 is configured to analyze and process the digital content such that the digital content is accelerated through portions where there is little or no dialog or speech. To enable these operations, the content acceleration system 200 comprises a content access module 202, a speech detector 204, a video recognition module 206, a verification module 208, a subtitle module 210, a segmenter 212, and a content acceleration module 214, all of which may be configured to communicate with each other (e.g., over a bus). The content acceleration system 200 may comprise other components not pertinent to example embodiments that are not shown or discussed. Alternative embodiments may comprise more, less, multiples of, or other components. Additionally, some functions of the components may be combined or divided into two or more further components. Further still, some of the components may be embodied within the digital receiver 102 while others are embodied within the headend 106.

The content access module 202 manages data exchange between the content acceleration system 200 and other components of the environment 100 in order to access the digital content. For example, the content acceleration system 200 receives or retrieves digital content from the headend 106 (e.g., in embodiments where the content acceleration system 200 is embodied within the digital receiver 102) or from the content provider 110. In embodiments where the digital receiver 102 is performing the acceleration processing, the digital content is locally buffered by the content access module 202 to enable the content acceleration system 200 to dynamically process the digital content prior to presentation on the viewing device 104.

The speech detector 204 analyzes the audio track (also referred to as "audio content signal) of the digital content accessed or retrieved by the content access module 202. In particular, the speech detector 204 examines the audio track to detect an audio portion (also referred to as "speech portion"). The speech detector 204 also separates speech from music or background noise. In example embodiments, the speech detector 204 detects speech based on pitch within a speech range found in the audio track. Additionally, the speech detector 204 uses contextual information to detect speech. For example, a sentence is typically a few seconds long. Therefore, if the speech detector 204 detects something less than a 0.1 seconds, the speech detector 204 determines that it is not speech (e.g., a background noise). The analysis performed by the speech detector 204 is then provided to the segmenter 212 and used to segment the digital content or digital content signal. In example embodiments, the speech portions detected by the speech detector 204 are used as a baseline, and detection enhancements are performed by, for example, the video recognition module 206 and the verification module 208.

The video recognition module 206 manages video cues that assist in verifying speech portions. In some embodiments, the video recognition module 206 detects scene changes. Typically, speech conversations do not occur across a scene change. Therefore, the detection of the scene change by the video recognition module 206 is used by the verification module 208 to verify if speech is present in a particular audio portion. For example, the audio portion can be aligned with a scene change boundary. As a result, for example, digital content can be sped through a first scene with no speech, slowed for a beginning of a second scene that has speech, and then sped through a remainder of the second scene after the audio portion.

In some embodiments, the video recognition module 206 performs face recognition and lip movement detection. Face recognition and lip movement detection data is also used by the verification module 208 to confirm, verify, or adjust the speech portion. For example, a speech portion that extends beyond lip movement is determined to be noise that should be ignored during acceleration processing. Conversely, the face recognition and lip movement detection data can identify speech missed by the speech detector 204.

The subtitle module 210 manages use of subtitles (also referred to as "closed caption data") in the acceleration processing. The closed caption data comprises timing information (e.g., start and stop times of speech). In one embodiment, the subtitle module 210 uses this information to confirm, verify, or adjust the audio portions detected by the speech detector 204. The use of subtitles typically results in less costly computations versus operations performed by the speech detector 204, video recognition module 206, and the verification module 208 (e.g., instead of detecting the speech or performing verification/cross-check the detected speech). Therefore, in an alternative embodiment, the processing by the subtitle module 210 can be used instead of processing by the speech detector 204 to reduce computation costs (e.g., used as the baseline), The segmenter 212 divides the digital content signal (e.g., both the audio content signal and the video content signal) into segments for acceleration processing. In example embodiments, the segmenter 212 receives the speech portions detected by the speech detector 204 (or the subtitle module 210) and divides the digital content signal such that a beginning of each speech portion (e.g., dialog) coincides with a beginning of each digital content segment (e.g., comprising audio content segment and video content segment).

The content acceleration module 214 manages the acceleration of the digital content when the system is in the audio driven conversation mode. In a baseline embodiment, the content acceleration module 214 plays out the speech at a regular speed and compresses the video data to the same length as the speech (e.g., same length as the audio portion). For example, assume a segment comprises three seconds of audio or speech over 18 seconds of video. For the segment, the acceleration module 214 plays out the digital content segment for three seconds, so the entire audio is played back and video is compressed from 18 seconds to three seconds.

To enhance digital content acceleration, the audio can be accelerated in a further embodiment. For example, for a one minute segment of digital content, assume that there is ten seconds of audio. Therefore, baseline content acceleration would accelerate the video 6×. To further enhance the playback, the content acceleration module 214 can accelerate the audio by 10% such that the playback of the digital content now occurs over nine seconds.

In the previous example embodiments, the content acceleration module 214 accelerates the video linearly. However, in alternative embodiments, the content acceleration module 214 can vary the video acceleration. For example, the content acceleration module 214 can initially accelerate the video quickly and then smooth out the fast forward (e.g., 2× to 4× to 8× to 4× to 2×).

Figure 3:
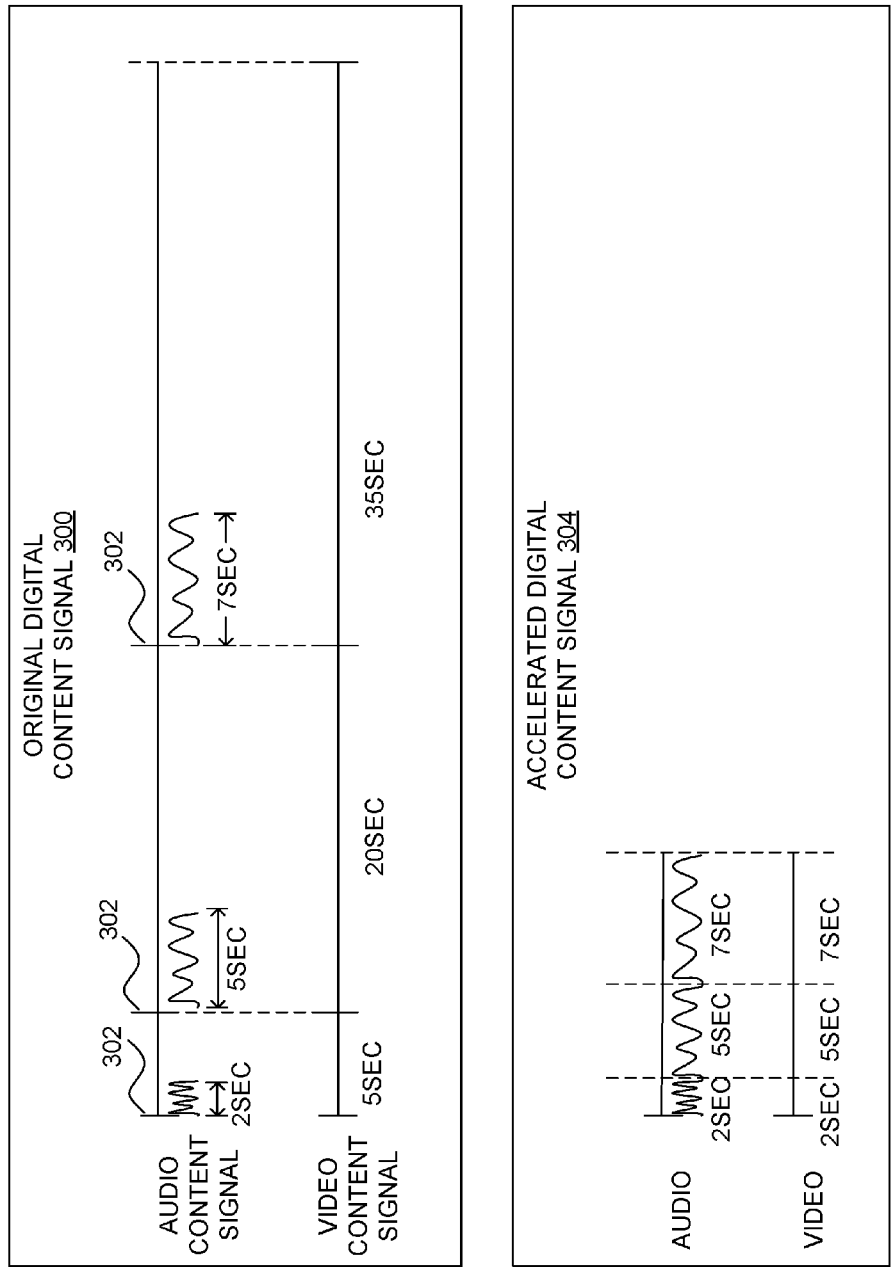
FIG. 3 is a diagram illustrating acceleration of digital content signals.

FIG. 3 is a diagram illustrating acceleration of the digital content signal. As shown in an original digital content signal 300 (comprising an audio content signal and a video content signal), three different speech portions of various lengths (e.g., two seconds, five seconds, and seven seconds) are detected, for example, by the speech detector 204. The beginning of each detected speech portion is used as a beginning 302 of each digital content segment of the digital content signal. As shown, the digital content signal is segmented, by the segmenter 212, into digital content segments of varying lengths (e.g., a five second segment, 20 second segment, and 35 second segment) based on the location of the start of each speech portion.

Once the digital content signal is segmented and the content acceleration processing performed, the content acceleration module 214 accelerates the digital content during playback. As shown in the accelerated digital content signal 304, the digital content is accelerated such that the audio content signal is played back without pause between the speech portions and the video content signal is accelerated to match their respective speech portions. As such, one minute of digital content is reduced to 14 seconds. In an alternative embodiment, a slight pause (e.g., one second) may be inserted between each digital content segment to delineate between the different speech portions.

Figure 4:
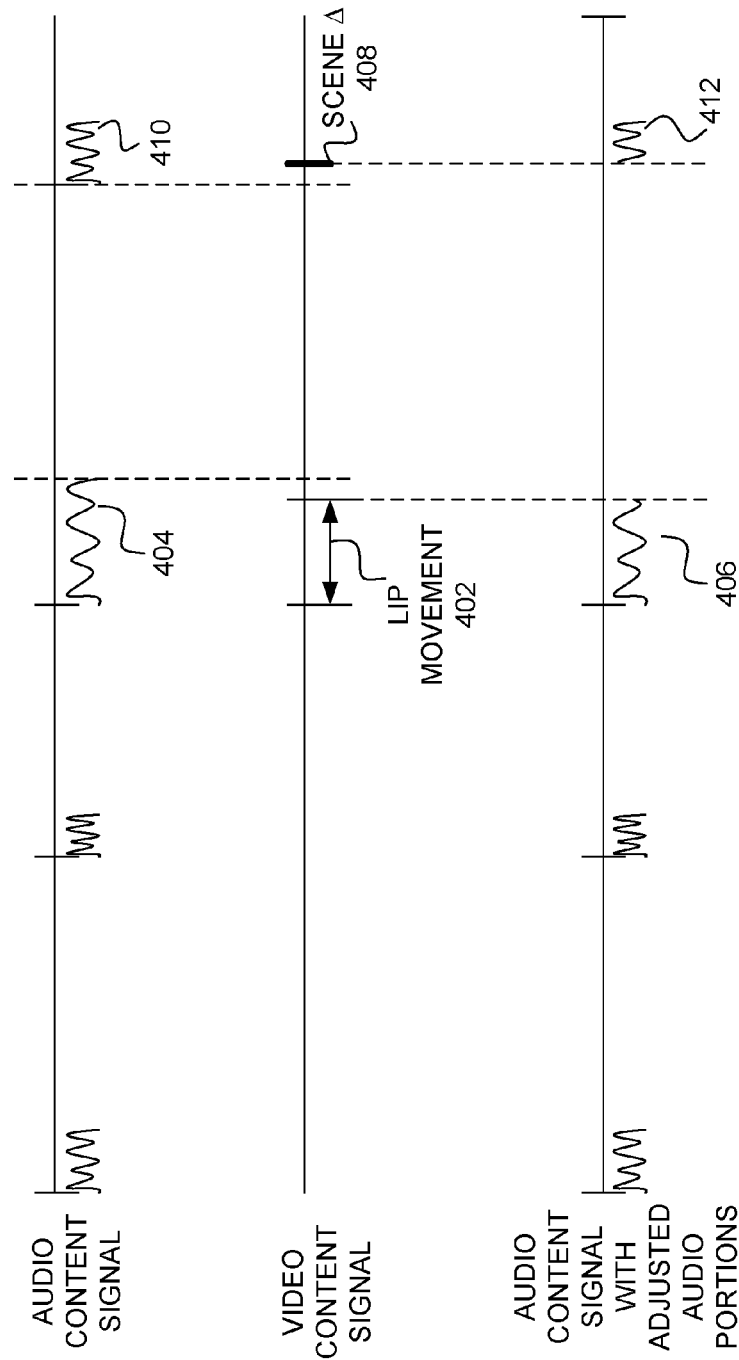
FIG. 4 is a diagram illustrating use of video cues to verify audio portions.

FIG. 4 is a diagram illustrating use of video cues to verify audio portions. As shown in FIG. 4, four audio portions are identified (e.g., by the speech detector 204). In an example embodiment, the video recognition module 206 detects lip movement 402 during a portion of the video content signal. The lip movement 402 detected by the video recognition module 206 is less in duration than a corresponding audio portion 404 detected by the speech detector 204. As such, the audio detected past the lip movement 402 in the audio portion 404 is considered noise. Accordingly, the verification module 208 adjusts the audio portion 404 to correspond to a length of the detected lip movement 402 resulting in an adjusted audio portion 406.

In another embodiment, the video recognition module 206 detects a scene change 408. In this embodiment, the scene change 408 signals a start or end of an audio portion. However, a corresponding audio portion 410 begins prior to the scene change 408. Therefore, the verification module 208 adjusts the audio portion 410 to correspond to a beginning of the scene change 408 resulting in an adjusted audio portion 412.

Figure 5:
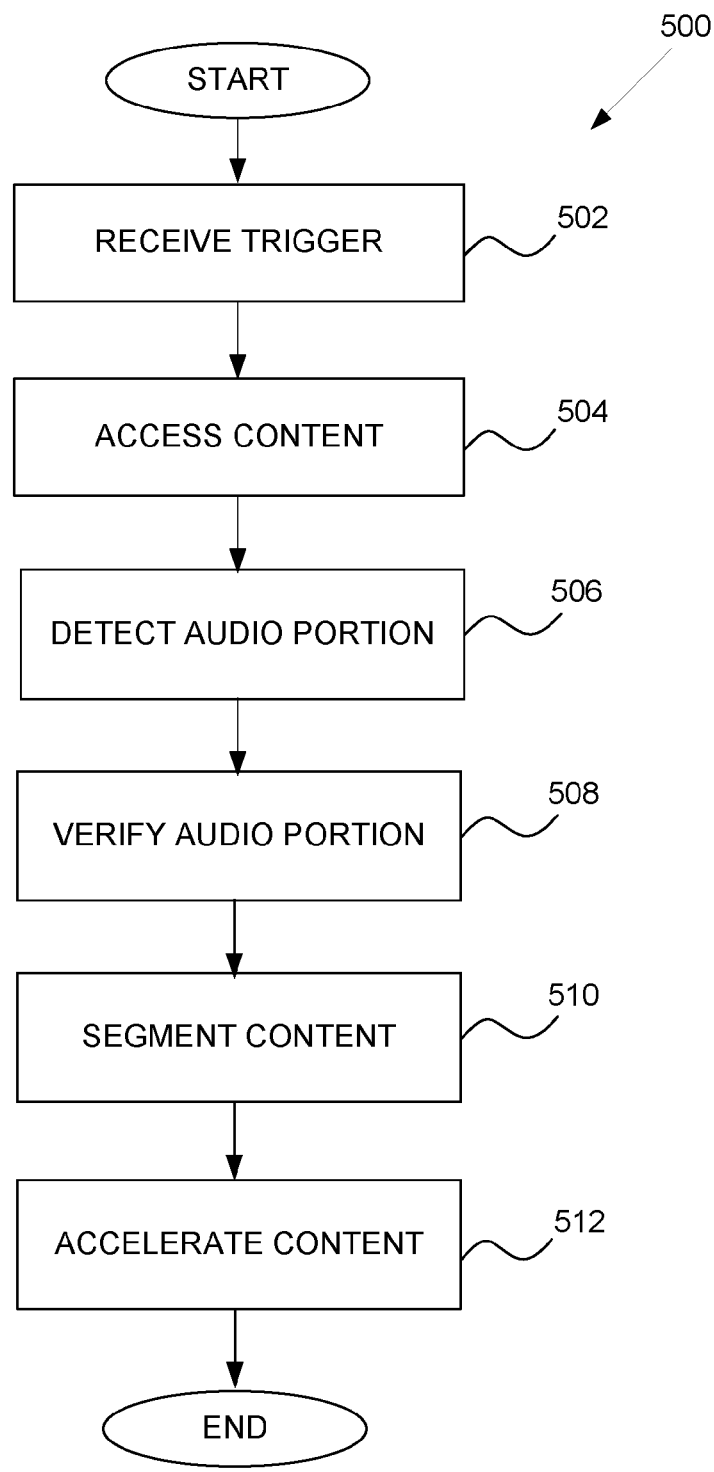
FIG. 5 is a flow diagram of an example method for audio driven accelerated binge watching.

FIG. 5 is a flow diagram of an example method 500 for audio driven accelerated binge watching. In example embodiments, the method 500 is performed in part or in whole by components of the content acceleration system 200 which can be embodied either in whole or part in the digital receiver 102 or the headend 106. Accordingly, the method 400 is described by way of example with reference to the content acceleration system 200. However, it shall be appreciated that at least some of the operations of the method 500 may be deployed on various other hardware configurations or be performed by similar components residing elsewhere in the environment 100. Therefore, the method 500 is not intended to be limited to the content acceleration system 200.

In operation 502, a trigger is received to activate the audio driven conversation mode. In one embodiment, a signal is received from a remote control device that triggers the activation of the audio driven conversation mode. In the audio driven conversation mode, the fast forward or acceleration of the digital content is automatic (e.g., without human intervention of having to manually fast forward and stop at various locations of the digital content).

In operation 504, the digital content is accessed. In example embodiments, the digital content is retrieved or received by the content access module 202 (e.g., from the headend 106 or from the content provider 110). In embodiments where the digital receiver 102 is performing the acceleration processing, the digital content is accessed ahead of a section being concurrently played back and locally buffered by the content access module 202 to enable the content acceleration system 200 to dynamically process the digital content prior to presentation on the viewing device 104.

In operation 506, speech is detected. In one embodiment, the speech detector 204 examines the audio content signal of the digital content to detect one or more audio portions or speech portions. Accordingly, the speech detector 204 attempts to separate speech from music or background noise. In one embodiment, the speech detector 204 uses pitch to distinguish speech from other sounds.

In operation 508, the audio portions are verified. In example embodiments, the audio portions detected by the speech detector 204 in operation 506 are used as a baseline, and detection enhancements are performed by the video recognition module 206 and the verification module 208, as will be discussed in more detail in connection with FIG. 6. In some embodiments, operation 508 is optional (e.g., when subtitle data is used instead).

In operation 510, the digital content is segmented by the segmenter 212. Accordingly, the segmenter 212 segments both the audio content signal and the video content signal into segments for acceleration processing. In example embodiments, the segmenter 212 receives the audio portions detected by the speech detector 204 (or the subtitle module 210) and segments the digital content signal such that a beginning of each audio portion (e.g., dialog) coincides with a beginning of each digital content segment (e.g., beginning of each audio content signal and beginning of each video content signal).

In operation 512, the digital content signal is accelerated by the content acceleration module 214. In a baseline embodiment, the content acceleration module 214 plays out the speech at a regular speed and compresses the video data to be the same length as the speech. For example, assume a segment comprises ten seconds of audio or speech over 18 seconds of video. For the digital content segment, the acceleration module 214 plays out the digital content segment for ten seconds, so the entire audio portion is played back (e.g., with the remaining part of the audio content signal skipped) and the video content signal is compressed from 18 seconds to ten seconds. To further enhance the playback, the content acceleration module 214 can accelerate the audio content signal by a percentage (e.g., 10%) such that the playback of the digital content now occurs even faster (e.g., over nine seconds). Further still, the content acceleration module 214 can vary the video content signal acceleration instead of performing a linear acceleration. For example, the content acceleration module 214 can accelerate the video quickly and then smooth out fast forward (e.g., 2× to 4× to 8× to 4× to 2×).

Figure 6:
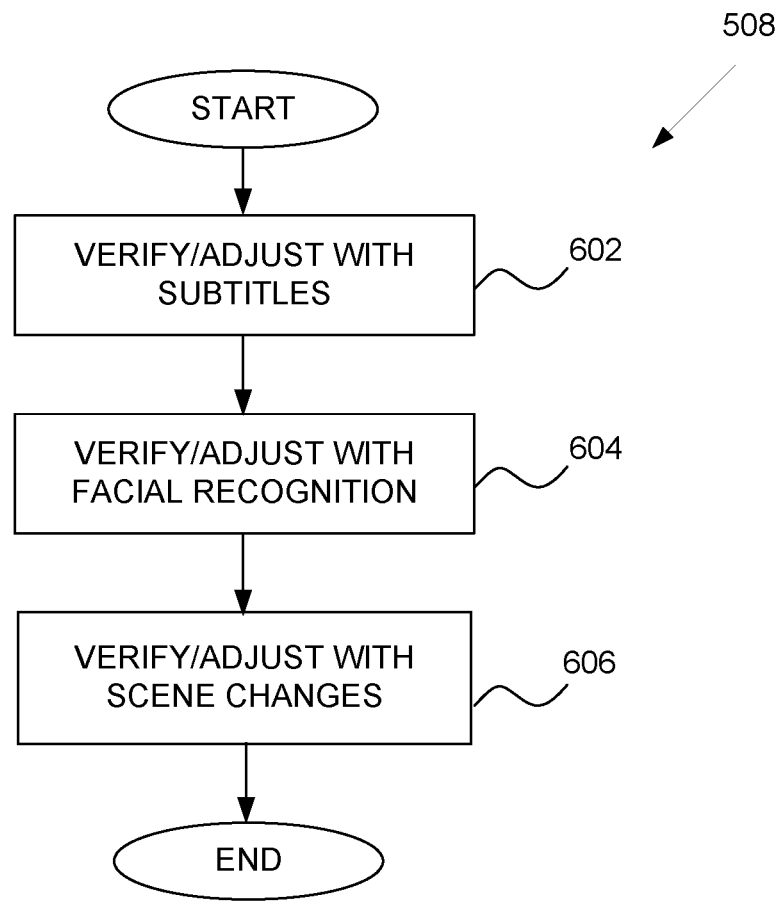
FIG. 6 is a flow diagram of an example method for verifying and accelerating digital content.

FIG. 6 is a flow diagram of an example method (operation 508) for verifying the audio portions. In some embodiments, the method is performed in part or in whole by components of the content acceleration system 200 which can be embodiment either in whole or part in the digital receiver 102 or the headend 106. Accordingly, the method is described by way of example with reference to the content acceleration system 200. However, it shall be appreciated that at least some of the operations of the method may be deployed on various other hardware configurations or be performed by similar components residing elsewhere in the environment 100. Therefore, the method is not intended to be limited to the content acceleration system 200.

In operation 602, the audio portions are verified using subtitle data (also referred to as "closed caption data"). In example embodiments, the subtitle module 210 uses closed caption data (e.g., timing information such as start and stop times of speech) to confirm, verify, or adjust the audio portions detected by the speech detector 204 (e.g., verify or adjust start and stop times of the audio portions). While the use of subtitle data can be used to verify or adjust audio portions already detected by the speech detector 204, alternatively, the subtitle data can be used to determine the audio portions instead of processing by the speech detector 204.

In operation 604, facial recognition is used to verify the audio portions. In example embodiments, the video recognition module 206 manages video cues that assist in verifying audio portions. As such, the video recognition module 206 performs face recognition and lip movement detection in operation 604. The face recognition and lip movement detection information is used by the verification module 208 to verify or adjust the audio portions. For example, an audio portion may extend beyond detected lip movement and is determined to be noise that should be ignored during acceleration processing. Conversely, the use of face recognition and lip movement detection information can detect speech that was missed by the speech detector 204.

In operation 606, scene change data is used to verify the audio portions. Accordingly, the video recognition module 206 detects scene changes. Typically, speech conversations do not occur across a scene change. Therefore, the detection of the scene change by the video recognition module 206 is used by the verification module 208 to verify whether speech should be present in a particular audio content segment (e.g., whether speech is detected over a scene change).

While the method discusses using subtitles, facial recognition, and scene changes to verify or adjust audio portions, alternative embodiments may comprise less operations. That is, one or more of operations 602-606 may not be practiced or is optional in alternative embodiments.

Figure 7:
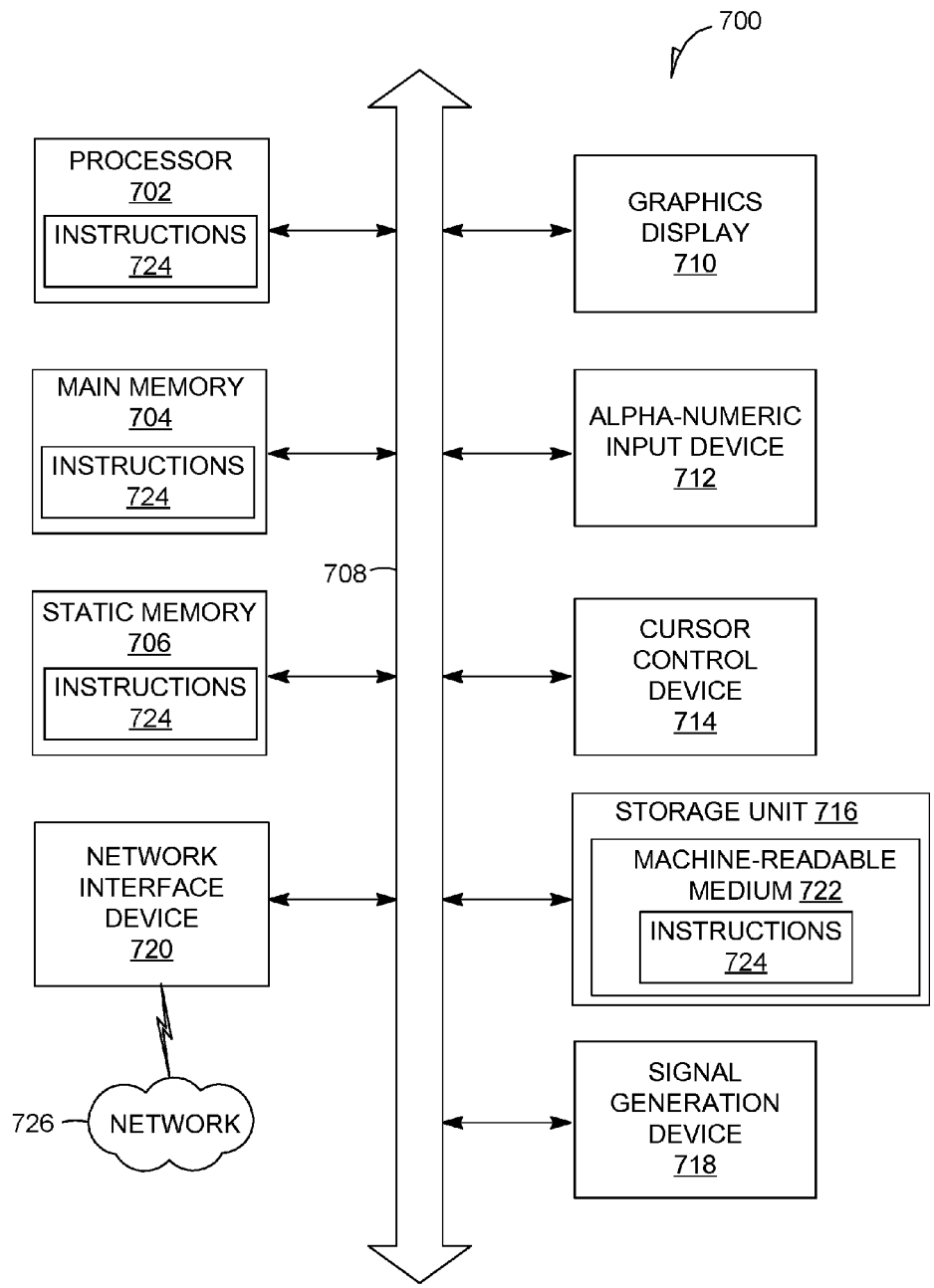
FIG. 7 is a simplified block diagram of a machine in an example form of a computing system within which a set of instructions for causing the machine to perform any one or more of the methodologies discussed herein may be executed.

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer device (e.g., a computer) within which the instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIGS. 5 and 6. The instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. The machine 700 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 700 capable of executing the instructions 724, sequentially or otherwise, that specify actions to be taken by that machine 700. Further, while only a single machine 700 is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, a signal generation device 718 (e.g., a sound card, an amplifier, a speaker, a headphone jack, or any suitable combination thereof), and a network interface device 720.

The storage unit 716 includes the machine-readable medium 722 (e.g., a tangible machine-readable storage medium) on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered machine-readable media 722 (e.g., tangible and non-transitory machine-readable media).

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown, in an example embodiment, to be a single medium, the term "machine-readable medium" should be taken to include a single medium or multiple media (e.g., a centralized or distributed database, or associated caches and servers) able to store instructions 724. The term "machine-readable medium" shall also be taken to include any medium, or combination of multiple media, that is capable of storing instructions 724 for execution by a machine (e.g., machine 700), such that the instructions 724, when executed by one or more processors of the machine 700 (e.g., processor 702), cause the machine 700 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 722 is non-transitory in that it does not embody a propagating or transitory signal. However, labeling the machine-readable medium 722 as "non-transitory" should not be construed to mean that the medium is incapable of movement—the medium should be considered as being transportable from one physical location to another. Additionally, since the machine-readable medium 722 is tangible, the medium may be considered to be a machine-readable device. Furthermore, the machine-readable medium 722 does not comprise any transitory signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Example 1 is a method for dynamically accelerating digital content presentation. Digital content is electronically accessed by a content access module. The digital content is analyzed, by a speech detector, to detect at least one audio portion within the digital content, whereby each audio portion comprises speech. At least one digital content segment is created by a segmenter from the digital content based on the at least one audio portion, whereby a beginning of each digital content segment of the at least one digital content segment coincide with a beginning of a corresponding audio portion of the at least one audio portion. Playback of the digital content is accelerated by fast forwarding through parts of each of the at least one digital content segment where speech is absent.

In example 2, the subject matter of example 1 can optionally include receiving a trigger to active an audio driven conversation mode, the audio driven conversation mode causing the analyzing, creating, and accelerating to occur.

In example 3, the subject matter of examples 1-2 can optionally include verifying an audio portion of the at least one audio portion.

In example 4, the subject matter of examples 1-3 can optionally include adjusting the audio portion based on the verifying, the adjusting comprising changing a beginning or end of the audio portion.

In example 5, the subject matter of examples 1-4 can optionally include wherein the verifying comprises performing lip movement detection on the digital content and determining whether the lip movement detection coincides with the audio portion.

In example 6, the subject matter of examples 1-5 can optionally include wherein the verifying comprises detecting a scene change in the digital content and determining whether the audio portion occurs over the scene change.

In example 7, the subject matter of examples 1-6 can optionally include wherein the verifying comprises accessing subtitle data, whereby the subtitle data comprises timing information for the speech and using the timing information to verify the audio portion.

In example 8, the subject matter of examples 1-7 can optionally include wherein the analyzing the digital content to detect the at least one audio portion comprises examining the digital content to identify pitch in a speech range.

In example 9, the subject matter of examples 1-8 can optionally include wherein the analyzing the digital content to detect the at least one audio portion comprises using timing information from subtitle data to detect the at least one audio portion.

In example 10, the subject matter of examples 1-9 can optionally include wherein the accelerating playback of the digital content comprises playing the speech within an audio signal segment of a digital content segment while accelerating a video signal segment of the digital content segment to coincide with a length of time to playback the speech.

In example 11, the subject matter of examples 1-10 can optionally include wherein the accelerating of the video signal segment is non-linear.

In example 12, the subject matter of examples 1-11 can optionally include wherein the accelerating playback of the digital content comprises accelerating the speech within an audio signal segment of a digital content segment while accelerating a video signal segment of the digital content segment to coincide with a length of time to play the accelerated speech.

Example 13 is a non-transitory machine-readable medium storing instructions which, when executed by the at least one processor of a machine, cause the machine to perform operations. The operations include electronically accessing digital content; analyzing the digital content to detect at least one audio portion within the digital content, whereby each audio portion comprises speech; creating at least one digital content segment from the digital content based on the at least one audio portion, whereby a beginning of each digital content segment of the at least one digital content segment coincides with a beginning of a corresponding audio portion of the at least one audio portion; and accelerating playback of the digital content by fast forwarding through parts of each of the at least one digital content segment where speech is absent.

Example 14 is a system for dynamically accelerating digital content presentation. The system includes one or more processors configured to at least: electronically access digital content; analyze the digital content to detect at least one audio portion within the digital content, whereby each audio portion comprises speech; create at least one digital content segment from the digital content based on the at least one audio portion, whereby a beginning of each digital content segment of the at least one digital content segment coincides with a beginning of a corresponding audio portion of the at least one audio portion; and accelerate playback of the digital content by fast forwarding through parts of each of the at least one digital content segment where speech is absent.

In example 15, the subject matter of example 14 can optionally include wherein the one or more processors are further configured to verify an audio portion of the at least one audio portion and adjust the audio portion, the one or more processors configured to adjust the audio portion by changing a beginning or end of the audio portion based on the verifying.

In example 16, the subject matter of examples 14-15 can optionally include wherein the one or more processors are further configured to verify an audio portion of the at least one audio portion by performing lip movement detection on the digital content and determining whether the lip movement detection coincides with the audio portion.

In example 17, the subject matter of examples 14-16 can optionally include wherein the one or more processors are further configured to verify an audio portion of the at least one audio portion by detecting a scene change in the digital content and determining whether the audio portion occurs over the scene change.

In example 18, the subject matter of examples 14-17 can optionally include wherein the one or more hardware processors are configured to analyze the digital content to detect the at least one audio portion by examining the digital content to identify pitch in a speech range.

In example 19, the subject matter of examples 14-18 can optionally include wherein the one or more hardware processors are configured to analyze the digital content to detect the at least one audio portion by using timing information from subtitle data to detect the at least one audio portion.

In example 20, the subject matter of examples 14-19 can optionally include wherein the one or more hardware processors are configured to accelerate playback of the digital content by playing the speech within an audio signal segment of a digital content segment while accelerating a video signal segment of the digital content segment to coincide with a length of time to play the speech.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 722 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 702 or a group of processors 702) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

The invention claimed is:

1. A method comprising:
   electronically accessing, using a content access module, digital content;
   analyzing the digital content, by a speech detector, to detect at least one audio portion within the digital content by using timing information from subtitle data to detect the at least one audio portion, each of the at least one audio portion comprising speech;
   verifying an audio portion of the at least one audio portion;
   adjusting the audio portion based on the verifying, the adjusting comprising changing a beginning or end of the audio portion;
   creating, by a segmenter, at least one digital content segment from the digital content based on the at least one audio portion, a beginning of each digital content segment of the at least one digital content segment coinciding with a beginning of a corresponding audio portion of the at least one audio portion; and
   accelerating, using one or more hardware processors, playback of the digital content by fast forwarding through parts of each of the at least one digital content segment where speech is absent.

2. The method of claim 1, further comprising receiving a trigger to activate an audio driven conversation mode, the audio driven conversation mode causing the analyzing, creating, and accelerating to occur.

3. The method of claim 1, wherein the verifying comprises:
   performing lip movement detection on the digital content; and
   determining whether the lip movement detection coincides with the audio portion.

4. The method of claim 1, wherein the verifying comprises:
   detecting a scene change in the digital content; and
   determining whether the audio portion occurs over the scene change.

5. The method of claim 1, wherein the verifying comprises:
   accessing subtitle data, the subtitle data comprising timing information for the speech; and
   using the timing information to verify the audio portion.

6. The method of claim 1, wherein the analyzing the digital content to detect the at least one audio portion comprises examining the digital content to identify pitch in a speech range.

7. The method of claim 1, wherein the accelerating playback of the digital content comprises playing the speech within an audio signal segment of a digital content segment while accelerating a video signal segment of the digital content segment to coincide with a length of time to playback the speech.

8. The method of claim 7, wherein the accelerating of the video signal segment is non-linear.

9. The method of claim 1, wherein the accelerating playback of the digital content comprises accelerating the speech within an audio signal segment of a digital content segment while accelerating a video signal segment of the digital content segment to coincide with a length of time to play the accelerated speech.

10. A non-transitory machine readable medium storing instructions that, when executed by one or more processors of a machine, cause the machine to perform operations comprising:
electronically accessing digital content;
analyzing the digital content to detect at least one audio portion within the digital content by using timing information from subtitle data to detect the at least one audio portion, each of the at least one audio portion comprising speech;
verifying an audio portion of the at least one audio portion, the verifying comprising:
accessing subtitle data, the subtitle data comprising timing information for the speech, and
using the timing information to verify the audio portion;
creating at least one digital content segment from the digital content based on the at least one audio portion, a beginning of each digital content segment of the at least one digital content segment coinciding with a beginning of a corresponding audio portion of the at least one audio portion; and
accelerating playback of the digital content by fast forwarding through parts of each of the at least one digital content segment where speech is absent.

11. The non-transitory machine readable medium of claim 10, wherein the analyzing the digital content to detect the at least one audio portion comprises using the timing information from the subtitle data to detect the at least one audio portion.

12. A system comprising:
one or more processors; and
a memory storing instructions that, when executed by le one or more processors, causes the one or more processors to perform operations comprising:
electronically accessing digital content;
analyzing the digital content to detect at least one audio portion within the digital content, each of the at least one audio portion comprising speech;
verifying an audio portion of the at least one audio portion, the verifying comprising performing lip movement detection on the digital content, and
determining whether the lip movement detection coincides with the audio portion;
creating at least one digital content segment from the digital content based on the at least one audio portion, a beginning of each digital content segment of the at least one digital content segment coinciding with a beginning of a corresponding audio portion of the at least one audio portion; and
accelerating playback of the digital content by fast forwarding through parts of each of the at least one digital content segment where speech is absent.

13. The system of claim 12, wherein the verifying further comprises
adjusting the audio portion by changing a beginning or end of the audio portion based on the verifying.

14. The system of claim 12, wherein the verifying further comprises:
detecting a scene change in the digital content; and
determining whether the audio portion occurs over the scene change.

15. The system of claim 12, wherein the operations further comprise analyzing the digital content to detect the at least one audio portion by examining the digital content to identify pitch in a speech range.

16. The system of claim 12, wherein the operations further comprise analyzing the digital content to detect the at least one audio portion by using timing information from subtitle data to detect the at least one audio portion.

17. The system of claim 12, wherein the operations further comprise accelerating playback of the digital content by playing the speech within an audio signal segment of a digital content segment while accelerating a video signal segment of the digital content segment to coincide with a length of time to play the speech.

18. A method comprising:
electronically accessing, using a content access module, digital content;
analyzing the digital content, by a speech detector, to detect at least one audio portion within the digital content, each of the at least one audio portion comprising speech;
verifying an audio portion of the at least one audio portion, the verifying comprising:
detecting a scene change in the digital content; and
determining whether the audio portion occurs over the scene change;
creating, by a segmenter, at least one digital content segment from the digital content based on the at least one audio portion, a beginning of each digital content segment of the at least one digital content segment coinciding with a beginning of a corresponding audio portion of the at least one audio portion; and
accelerating, using one or more hardware processors, playback of the digital content by fast forwarding through parts of each of the at least one digital content segment where speech is absent.

19. The method of claim 18, wherein the accelerating playback of the digital content comprises playing the speech within an audio signal segment of a digital content segment while accelerating a video signal segment of the digital content segment to coincide with a length of time to playback the speech.

20. The method of claim 18, wherein the accelerating playback of the digital content comprises accelerating the speech within an audio signal segment of a digital content segment while accelerating a video signal segment of the digital content segment to coincide with a length of time to play the accelerated speech.

21. A method comprising:
electronically accessing, using a content access module, digital content;
analyzing the digital content, by a speech detector, to detect at least one audio portion within the digital content, each of the at least one audio portion comprising speech, the analyzing comprising using timing information from subtitle data to detect the at least one audio portion;

creating, by a segmenter, at least one digital content segment from the digital content based on the at least one audio portion, a beginning of each digital content segment of the at least one digital content segment coinciding with a beginning of a corresponding audio portion of the at least one audio portion; and accelerating, using one or more hardware processors, playback of the digital content by fast forwarding through parts of each of the at least one digital content segment where speech is absent.

22. A method comprising:

electronically accessing, using a content access module, digital content;

analyzing the digital content, by a speech detector, to detect at least one audio portion within the digital content, each of the at least one audio portion comprising speech;

creating, by a segmenter, at least one digital content segment from the digital content based on the at least one audio portion, a beginning of each digital content segment of the at least one digital content segment coinciding with a beginning of a corresponding audio portion of the at least one audio portion; and accelerating, using one or more hardware processors, playback of the digital content by fast forwarding through parts of each of the at least one digital content segment where speech is absent, the accelerating comprising playing the speech within an audio signal segment of a digital content segment while accelerating a video signal segment of the digital content segment to coincide with a length of time to playback the speech.

23. The method of claim 22, wherein the accelerating of the video signal segment is non-linear.

24. A method comprising:

electronically accessing, using a content access module, digital content;

analyzing the digital content, by a speech detector, to detect at least one audio portion within the digital content, each of the at least one audio portion comprising speech;

creating, by a segmenter, at least one digital content segment from the digital content based on the at least one audio portion, a beginning of each digital content segment of the at least one digital content segment coinciding with a beginning of a corresponding audio portion of the at least one audio portion; and accelerating, using one or more hardware processors, playback of the digital content by fast forwarding through parts of each of the at least one digital content segment where speech is absent, the accelerating comprising accelerating the speech within an audio signal segment of a digital content segment while accelerating a video signal segment of the digital content segment to coincide with a length of time to play the accelerated speech.

* * * * *

UNITED STATES PATENT AND TRADEMARK OFFICE
CERTIFICATE OF CORRECTION

PATENT NO. : 10,026,417 B2  
APPLICATION NO. : 15/136278  
DATED : July 17, 2018  
INVENTOR(S) : Kai Sun Page 1 of 1

It is certified that error appears in the above-identified patent and that said Letters Patent is hereby corrected as shown below:

On the Title Page

Item [56], Column 2, under "Foreign Patent Documents", Line 2, delete "WO-20171849551" and insert --WO-2017184955-- therefor In the Claims Column 15, Line 47, in Claim 12, delete "le" and insert --the-- therefor Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*